United States Patent
Kozloski et al.

(10) Patent No.: US 8,781,668 B1
(45) Date of Patent: Jul. 15, 2014

(54) LOCATION-BASED VEHICLE POWERTRAIN REGULATION SYSTEM

(71) Applicant: International Business Machines Corporation, Armonk, NY (US)

(72) Inventors: James R. Kozloski, New Fairfield, CT (US); Clifford A. Pickover, Yorktown Heights, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/965,343

(22) Filed: Aug. 13, 2013

Related U.S. Application Data

(63) Continuation of application No. 13/721,510, filed on Dec. 20, 2012.

(51) Int. Cl.
*B60W 20/00* (2006.01)

(52) U.S. Cl.
USPC ............. 701/22; 180/65.28; 180/65.285

(58) Field of Classification Search
USPC ................. 701/22; 180/65.28, 65.285
See application file for complete search history.

(56) References Cited

U.S. PATENT DOCUMENTS

| | | | |
|---|---|---|---|
| 6,944,679 B2 | 9/2005 | Parupudi et al. | |
| 7,346,439 B2 | 3/2008 | Bodin | |
| 2002/0152009 A1* | 10/2002 | Bartoli | 701/29 |
| 2005/0149248 A1 | 7/2005 | Polen et al. | |
| 2006/0041370 A1 | 2/2006 | Gault et al. | |
| 2010/0318373 A1 | 12/2010 | Harris | |
| 2011/0029170 A1 | 2/2011 | Hyde et al. | |
| 2011/0029358 A1 | 2/2011 | Hyde et al. | |
| 2011/0077806 A1* | 3/2011 | Hyde et al. | 701/22 |
| 2011/0087399 A1 | 4/2011 | Hyde et al. | |
| 2011/0106591 A1 | 5/2011 | Eckhoff et al. | |
| 2011/0246022 A1 | 10/2011 | Bai | |
| 2011/0276215 A1 | 11/2011 | Wending et al. | |

* cited by examiner

*Primary Examiner* — Mary Cheung
*Assistant Examiner* — Brian P. Sweeney
(74) *Attorney, Agent, or Firm* — Cantor Colburn LLP; Vazken Alexanian

(57) ABSTRACT

A vehicle control system to control operation of a vehicle includes a powertrain system operable according to a plurality of operating modes that drive the vehicle. A sensor is mounted to the vehicle to detect a quality of air surrounding the vehicle. A vehicle control module is configured to select an operating mode of the powertrain system. The operating mode is selected to reduce at least one emission exhausted from the vehicle that contributes to a low air quality measure by the sensor.

7 Claims, 3 Drawing Sheets

US 8,781,668 B1

LOCATION-BASED VEHICLE POWERTRAIN REGULATION SYSTEM

CROSS-REFERENCE TO RELATED APPLICATION

This application is a continuation of U.S. patent application Ser. No. 13/721,510, filed Dec. 20, 2012, the disclosure of which is incorporated by reference herein in its entirety.

BACKGROUND

The present invention relates generally to a vehicle powertrain control system, and more particularly, a location-based vehicle control system that regulates powertrain operation based on powertrain operating parameters.

As more vehicles located in urbanized areas of the word compete for increasingly scarce resources (e.g., highways, fuel, and pollution quotas), municipalities have an interest and opportunity to encourage driving behavior that is both environmentally and socially conscientious. Municipalities currently monitor traffic patterns and congestion to obtain an indicator for influencing driver behavior. For example, municipalities may increase toll rates in certain areas and at certain times of day based on traffic volume to facilitate a different use of the limited transportation resources.

To date, only manual solutions are available for mitigating the environmentally and socially conscientious consequences caused by the limited transportation resources. For example, highway congestion and pollution have been addressed by adding high-occupancy vehicle (HOV) lanes to at high-traffic urban highways. Further, the flow of traffic traversing the HOV lanes can be controlled based on the time of day. However, manual solutions have been traditionally implemented regardless of the operating parameters of the engine. Conventional powertrain systems, therefore, do not apply municipality location-based policies according to vehicle powertrain operating parameters.

SUMMARY

According to one embodiment, a vehicle control system to control operation of a vehicle includes a powertrain system operable according to a plurality of operating modes that drive the vehicle. A sensor is mounted to the vehicle to detect a quality of air surrounding the vehicle. A vehicle control module is configured to select an operating mode of the powertrain system. The operating mode is selected to reduce at least one emission exhausted from the vehicle that contributes to a low air quality measure by the sensor.

According to another embodiment, a powertrain system comprises a global position satellite (GPS) system and a control module. The GPS system determines a location of a vehicle operated by the powertrain system. The control module communicates with a remotely located municipality module to obtain at least one stored powertrain parameter. The control module is configured to determine at least one current operating condition of the powertrain system. The control module further selects an operating mode of the powertrain system among a plurality of operating modes based on a comparison between the at least one current operating condition and the at least one stored powertrain parameter.

In yet another embodiment, a method of controlling a vehicle powertrain system comprises storing at least one powertrain parameter in a data base, and determining at least one operating condition of the powertrain system. The method further includes determining a location of a vehicle operated by the powertrain system, and comparing the at least one operating condition to the at least one powertrain parameter. The method further includes selecting an operating mode of the powertrain system among a plurality of operating modes that control the powertrain system based on the comparison.

Additional features are realized through the techniques of the present invention. Other embodiments are described in detail herein and are considered a part of the claimed invention. For a better understanding of the invention and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features are apparent from the following detailed description taken in conjunction with the accompanying drawings in which:

DETAILED DESCRIPTION

Figure 1:
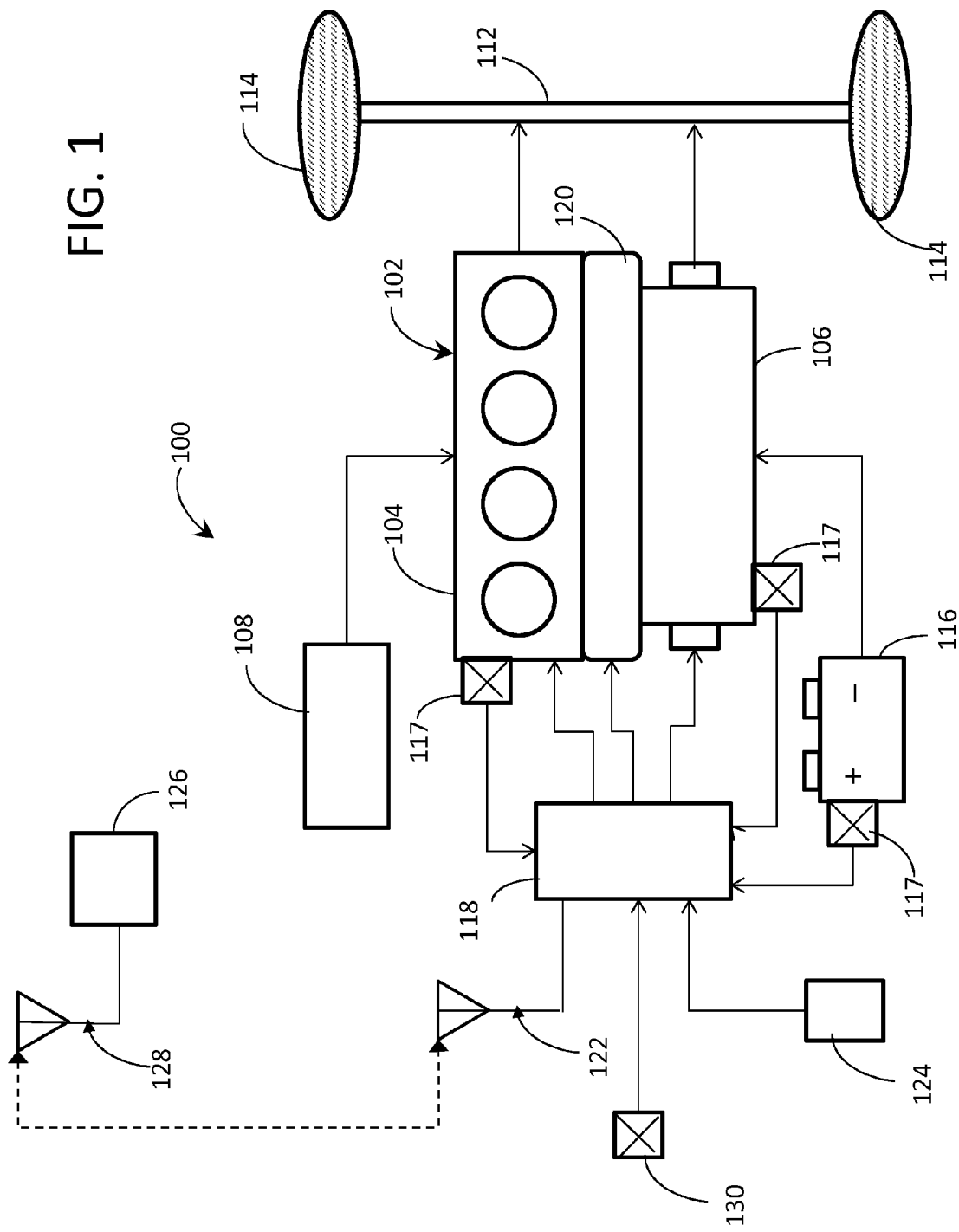
FIG. 1 is a block diagram illustrating a location-based powertrain control system according to an embodiment.

Referring now to FIG. 1, a location-based powertrain control system 100 is illustrated. The location-based powertrain control system 100 includes a powertrain system 102 of a vehicle. The vehicle according to an embodiment includes, for example, a plug-in hybrid electric vehicle (PHEV). The powertrain system 102 includes two on-board power systems. The power systems include, for example, an engine 104 and a hybrid electric motor/generator (HEM) 106. The engine 104, such as an internal combustion engine (ICE), for example, generates a first mechanical power by combusting hydrocarbon fuel, such as gasoline, stored in a fuel tank 108. The first mechanical power is transferred to a drive shaft 112. The drive shaft 112 rotates in response to the first mechanical power, which ultimately rotates the wheels 114 of the vehicle.

The HEM 106 converts electrical power stored in a rechargeable battery unit 116 into a second mechanical power. The second mechanical power may also be transferred to the drive shaft 112 to ultimately rotate the wheels 114. In one embodiment, the HEM 106 is a synchronous motor/generator, in which a permanent magnet is embedded in a rotor and a stator coil is wound around a stator. The HEM 106 is controlled by being selectively energized with three-phase alternating current delivered from an inverter (not shown). The inverter may selectively supply the electrical power from the battery unit 116 based on one or more HEM control signals, thereby adjusting the operation and mechanical output of the HEM 106.

Further, the rotor may act as an electricity generator that produces a generating power on both ends of the stator coil so as to recharge the battery unit 116. In addition to recharging the battery unit 116 using the rotor of the HEM 106, the battery unit 116 may be recharged according to other charging actions including, but not limited to, mechanical power transferred from the engine 104, regenerative braking, and connection to an external power supply.

The powertrain control system 100 further includes a powertrain control module 118 and a drive clutch 120. The powertrain control module 118 may receive operating parameters via sensors 117 incorporated with the engine 104, the HEM 106 and/or the battery unit 116. For example, a sensor 117 included with the engine 104 may output engine speed data, fuel intake data, piston timing, engine temperature. The sensor 117 may also detect carbon levels exhausted from the engine in response to combusting the fuel. In another example, sensors 117 may be implemented with the HEM 106 and the battery unit 116 to indicate battery charge levels, voltage and/or current levels realized by the HEM 106, motor temperature, and motor speed.

The powertrain control module 118 may operate as an engine negotiator component. That is, the power train control module 118 may output one or more control signals that adjust operation of the engine 104 and the HEM 106. For example, the powertrain control module 118 may output one or more engine control signals to the engine 104, and one or more HEM control signals to the HEM 106. An engine control signal may, for example, adjust fuel intake into cylinder chambers of the engine and/or piston timing to vary fuel combustion timing. A HEM control signal may vary power realized by the HEM 106, which adjusts mechanical power output. For example, the HEM control signal may vary the amount of power converted by the inverter, which reduces motor speed generated by the HEM 106. Accordingly, the second mechanical power realized by the drive shaft 112 may be adjusted.

The powertrain control module 118 may also output a clutch control signal that controls the drive clutch 120. In at least one embodiment, the drive clutch 120 is interposed between the engine 104 and the HEM 106 to adjust a torque transfer capacity between the engine 104 and the HEM 106. The drive clutch 120, therefore, may selectively engage/disengage the drive shaft 112 to the engine 104 and/or the HEM 106 based on the clutch control signal. Accordingly, the powertrain system 102 may selectively operate in a plurality of operating modes to drive the PHEV according to the engine 104, or the HEM 106, or the engine 104 and the HEM 106 simultaneously.

The plurality of powertrain operating modes includes, but is not limited to, an engine-only mode, a charge-depleting mode, a blended mode, a charge-sustaining mode, and a mixed mode. When the powertrain control module 118 initiates the engine-operating mode, the drive clutch 120 engages the engine 104 to the drive shaft 112, while disengaging the HEM 106 from the drive shaft 112. Accordingly, the PHEV is driven solely by the first mechanical power generated by the engine 104.

When the powertrain control module 118 initiates the charge-depleting mode, the PHEV is driven essentially by the HEM 106. More specifically, the charge-depleting mode disengages the engine 104, and engages the HEM 106 to the drive shaft 112. The second mechanical power from the HEM 106 drives the PHEV until the electrical charge of the battery unit 116 is depleted below a threshold value ($BATT_{TH}$). In one embodiment, the engine 104 may be engaged during hard accelerations, i.e., when the acceleration of the PHEV exceeds a threshold value. The engine 104 may then again be disengaged when the PHEV reaches a steady driving state, i.e., the acceleration is maintained within the threshold range. Once the battery charge falls below $BATT_{TH}$, the powertrain control module 118 initiates the engine-only mode. Accordingly, the drive clutch 120 disengages the HEM 106 and engages the engine 104 to drive the PHEV until the battery is recharged above $BATT_{TH}$.

When the powertrain control module 118 initiates the blended mode, the drive clutch 120 engages both the engine 104 and the HEM 106 simultaneously such that drive shaft 112 receives both the first and second mechanical power. Since the drive shaft 112 receives both the first and second mechanical power, the PHEV may achieve greater speeds and/or greater torque then would be realized if only the HEM 106 were engaged. For example, if vehicle speed resulting from the second mechanical power of the HEM 106 is too low, the blended mode may be initiated to engage the engine 104 such that the combined mechanical power from the HEM 106 and engine 104 achieves the desired vehicle speed.

When the powertrain control module 118 initiates the charge-sustaining mode, both the engine 104 and the HEM 106 may continuously be engaged/disengaged in such a manner that the powertrain system 102 is operated as efficiently as possible based on a battery charge level range. For example, when the charge level exists within a range having a low battery level ($BATT_{LOW}$) and a high battery level ($BATT_{HIGH}$), the powertrain control module 118 may instruct the drive clutch 120 to engage both the engine 104 and the HEM 106. If the battery charge falls below $BATT_{LOW}$, the powertrain control module 118 may instruct the drive clutch 120 to disengage the HEM 106 such that the drive shaft 112 is driven solely by the first mechanical power generated by the engine 104. While driving the PHEV exclusively by the engine 104, the battery unit 116 may be recharged by the engine 104, regenerative breaking, and/or an external power source. If the battery unit 116 is recharged such that the charge again exists within in the battery range, the HEM 106 may again be engaged to provide the second mechanical power to the drive shaft 112. If the battery unit 116 is recharged such that the charge exceeds $BATT_{HIGH}$, then the powertrain control module 118 may instruct the drive clutch 120 to disengage the engine 104 and drive the PHEV exclusively by the HEM 106 until the battery is charged to level that exists within the range of $BATT_{LOW}$ and $BATT_{HIGH}$.

When the mixed mode is initiated by the powertrain control module 118, a combination of the above modes may be utilized during an entire trip duration. For example, the PHEV may embark on trip starting in the charge-depleting mode and using the HEM 106 to exclusively drive 5 miles (8 km) at a low speed. The PHEV may then enter a freeway and operate in a blended mode for 20 miles (32 km), using 10 miles (16 km) worth of all-electric range at twice the fuel economy. Finally, the PHEV exits the freeway and drives for another 5 miles (8 km) without engaging the engine 104 until the full 20 miles (32 km) of all-electric range of the battery unit 116 is exhausted. At this point the PHEV can revert back to a charge-sustaining mode for another 10 miles (16 km) until the final destination is reached. Such a trip would be considered a mixed mode, as multiple modes of the powertrain system 102 are employed during the duration of the trip. The mixed-mode contrasts with a charge-depleting trip which would be driven within the limits of a PHEV's all-electric range. Conversely, the portion of a trip which extends beyond the all-electric range of a PHEV would be driven primarily in charge-sustaining mode.

The powertrain control module 118 may also include a communication module 122 and a location module 124. The communication module 122 has an antenna that electrically communicates, for example wirelessly, with a remotely located municipality module 126 that is operated by a city municipality. The municipality module 126 may include a storage device (not shown) that stores one or more regulated powertrain parameters as set by the municipality. For example, the municipality module 126 may store a lookup table (LUT) that cross-references one or more regulated powertrain parameters including, but not limited to, carbon emission level output desired by the municipality, with a corresponding powertrain mode of the powertrain system 102.

The municipality module 126 may also include a microcontroller (not shown) configured to predict various pollution events, such as smog levels and o-zone levels, based on current environmental conditions. Accordingly, the LUT may cross-reference one or more environmental parameters, such as atmospheric conditions including o-zone levels, smog levels and carbon levels, with a corresponding powertrain mode of the powertrain system 102.

The municipality module 126 may also store various types of vehicle information including, but not limited to, vehicle types, models, ages. The vehicle information may be cross-referenced in the LUT with regulated powertrain parameters as a function of secondary conditions. The secondary condition may include, for example, time of day, road conditions, weather, weather forecasts, traffic conditions, vehicle congestion, holidays, days of the week, elevation, incline of the vehicle, weight of the vehicle, current fuel prices, and state of emergencies. Based on the vehicle information, the municipality module 126 may determine various operating conditions of a powertrain system corresponding to a particular vehicle.

The powertrain control module 118 may determine that the PHEV is located in a municipality jurisdiction including a municipality module 126 based on the location information provided by the location module 124. For example, the location information may include global position satellite (GPS) coordinates of the vehicle. Based on the GPS information, the powertrain control module 118 may determine that the PHEV is located in a municipality jurisdiction including a municipality module 126, and then initiate communication with the municipality module 126. In another embodiment, the municipality module 126 may also include a communication module 128 having an antenna. Accordingly, the powertrain control module 118 and/or the municipality module 126 may electrically detect the presence of one another when the PHEV enters the municipality jurisdiction. The municipality module 126 may query the powertrain control module 118 for one or more powertrain parameters, such as carbon emissions output by the engine 104, in response to detecting the presence of the PHEV.

The communication between the powertrain control module 118 and the municipality module 126 allows municipalities to directly address environmentally and socially conscientious consequences caused by limited transportation resources. More specifically, the powertrain control module 118 may output powertrain operating parameters to the municipality module 126. The municipality module 126 may then compare the powertrain operating parameters with the regulated parameters stored in the LUT. If the powertrain operating parameters are not consistent with the regulated parameters set by the municipality, the municipality module 126 may output a regulation signal instructing the powertrain control module 118 to initiate a different powertrain mode of the powertrain system 102.

Suppose, for example, that a PHEV operating in an engine-only mode enters a municipality jurisdiction including the municipality module 126. The powertrain control module 118 determines the existence of the municipality module 126 based on GPS coordinates determined by the location module 124 and communicates powertrain operating parameters, such as carbon levels exhausted by the engine 104, to the municipality module 126. If the exhausted carbon levels exceed the regulated carbon levels stored in the LUT of the municipality module 126, the municipality module 126 may output a regulation signal instructing the powertrain control module 118 to switch the powertrain system mode from the engine-only mode to the charge-depleting mode. In response to the regulation signal, the powertrain control 118 module initiates the charge-depleting mode and controls the drive clutch to disengage the engine 104 and engage the HEM 106. As a result, the PHEV is driven exclusively by the HEM 106 and the level of carbon emission produced by the PHEV is reduced.

In at least one embodiment, the powertrain control module 118 performs the comparison between stored powertrain parameters and current powertrain operating parameters as opposed to the municipality module 126. The current powertrain operating parameters may include emissions exhausted from the vehicle and/or a quality of outside air local to the vehicle. If the current operating parameters do not comply with the stored parameters obtained from the municipality module 126, the powertrain control module 118 may select a different powertrain mode as discussed above.

The powertrain control module 118 may also control the powertrain operating mode based current operating parameters including, but not limited to, emissions exhausted from the vehicle and/or a quality of outside air local to the vehicle. According to at least one embodiment, the powertrain system 102 may further include one or more on-board air quality sensors 130 mounted at various locations of the vehicle. The air quality sensor 130 may be in electrical communication with the powertrain control module to sense the quality of air surrounding the vehicle and output a signal indicative of the air quality to the powertrain control module 118. The quality of air may be based on at least one of the o-zone of the surrounding atmosphere and/or the level of carbon emissions existing in the surrounding atmosphere. It is appreciated that the surrounding atmosphere ranges, for example, from the ground supporting the vehicle to about 17 kilometers (i.e., 56,000 ft) above the ground.

The powertrain control module 118 may compare the air quality to a predetermined threshold value. The threshold value may be stored at various locations including, but not limited to, a storage unit included in the powertrain control module, the municipality data base, and a cloud server in electrical communication with the powertrain control module. If the air quality is below the threshold value, the powertrain control module 118 may initiate a different operating mode of the powertrain system, which improves reduces at least one emission from the vehicle to improve the surrounding quality of air. For example, if the air quality is below the threshold value and the powertrain system 102 is operating in the engine-only mode, the powertrain control module 118 may output a clutch control signal that initiates the battery-depletion mode. Accordingly, the engine 104 is disengaged, and the vehicle is driven by only the HEM 106 such that the selected mode reduces at least one emission from the vehicle contributing to a low air quality measure by the air quality sensor 130.

In another embodiment, one or more risk factors may be considered before changing the powertrain mode of the powertrain system 102. The risk factors include, but are not limited to, risk factors associated with the PHEV, the driver of the PHEV, road conditions, weather, and a distance at which the PHEV is from a battery charging stations. For example, the powertrain control module 118 may output carbon emission levels exhausted from the engine 104 along with a battery charge level of the battery unit 116. If the battery charge exceeds a predetermined threshold value, the municipality module 126 may determine that there is no risk of the PHEV becoming disabled, and may consider whether the powertrain mode should be changed based on the carbon emissions level currently output by the engine. However, if the battery charge is below the predetermined threshold, the municipality module 126 may determine that disengaging the engine 104 poses a risk of disabling the PHEV. Accordingly, the municipality module 126 may select a powertrain module that utilizes both the engine 104 and the HEM 106, or allows the powertrain system of the PHEV to remain operating in the engine-only mode until the battery charge level is recharged to an acceptable level.

The driver of the vehicle may also manually indicate a risk level, which is output to the municipality module 126. For example, a driver may manually indicate a health emergency, which is communicated by the powertrain control module 118 to the municipality module 126. Based on the health emergency, the municipality module 126 may allow the powertrain system 102 of the PHEV to operate in a powertrain mode selected by the driver.

In another embodiment, the municipality module 126 may implement quotas corresponding to engine pollutants per unit of time, thereby allowing the sum of all vehicle driving modes to impact the environment over a specific amount of time. After such quotas have been met, the municipality may enforce more stringent powertrain operating regulations, such as automatically switching the powertrain system 102 out of an engine-only powertrain mode, to mitigate common pollution events such as smog alerts and/or o-zone alerts.

The powertrain control module 118 may alert the driver to a powertrain operating mode change request, and may receive one or more feedback inputs from the driver. That is, a driver may be presented with incentives to switch powertrain modes. For example, a positive incentive, such as a carbon tax credit, an automotive insurance discount, etc., may be provided to the driver in exchange for switching out of an engine-only powertrain mode. Alternatively, the driver may be presented with a toll or carbon tax/fee in exchange for allowing the driver to operate the vehicle in an engine-only powertrain mode during an environmental event, such as a smog-alert.

The powertrain control module 118 may wirelessly communicate the driver input to the municipality module 126. For example, the driver may be alerted of a request from the municipality to change powertrain mode using a sound and/or an icon displayed on a dashboard (not shown) of the PHEV. The driver may then choose to select the suggested powertrain mode, or may deny the request. The selection of the driver may then be wirelessly communicated to the municipality module 126. In one embodiment, if the driver chooses to deny the suggested powertrain mode, the municipality may assess a toll, i.e., fee, in exchange for allowing the user to maintain the current powertrain mode.

The dashboard may also display information, such as a summary of statistics, indicating powertrain mode changes in other drivers. For example, the dashboard may display and/or announce, "You are currently among 150 other drivers of which the municipality has adjusted powertrain parameters. Thank you for your cooperation." The summary of statistics may also be emailed, text, and/or communicated to a mobile device via a mobile application downloaded onto the driver's mobile device.

Figure 2:
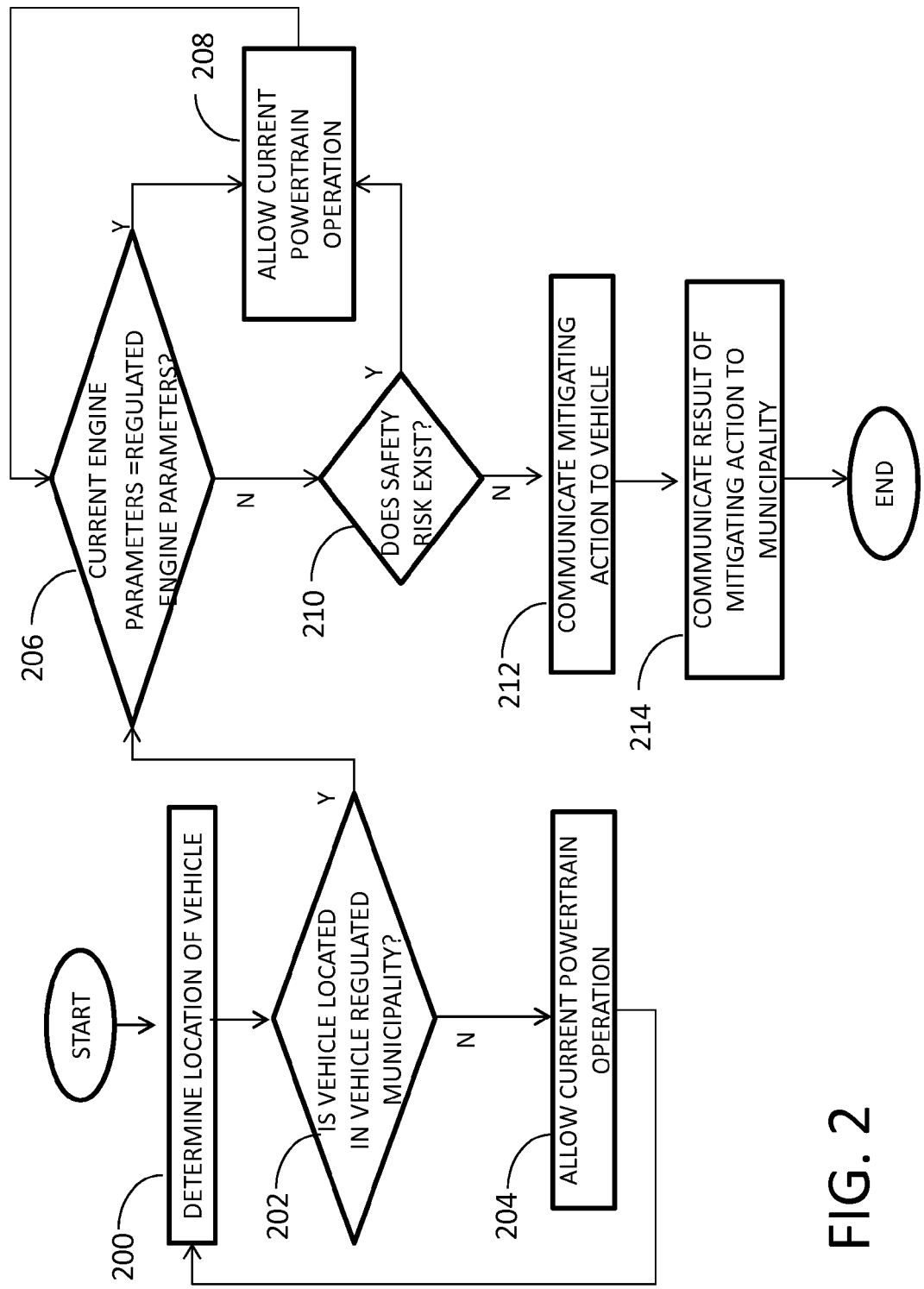
FIG. 2 is a flow diagram illustrating a method of controlling modes of a powertrain control system according to an embodiment.

Referring now to FIG. 2, a flow diagram illustrates a method of controlling modes of a location-based powertrain control system according to an embodiment. At operation 200, a location of a PHEV is determined. The location may be determined, for example, according to GPS coordinates. Based on the location of the PHEV, a determination as to whether the PHEV is located in a municipality-regulated location that regulates the powertrain operation of the PHEV is made at operation 202. If the PHEV is not located in a vehicle-regulated municipality, the current powertrain mode of the powertrain system is maintained at operation 204 and the location of the PHEV is again determined at operation 202.

If the PHEV is located in a vehicle-regulated municipality, however, the current operating parameters of the powertrain system, such as engine operating parameters, are determined by the municipality at operation 206. For example, carbon emission levels exhausted by the engine are communicated to a municipality module storing a carbon emissions threshold value. If the exhausted carbon emission levels are within the threshold value, the current powertrain mode of the PHEV is maintained at operation 208, and the exhausted carbon level continues to be monitored at operation 206. If the exhausted carbon level exceeds the threshold value, however, a safety risk is determined at operation 210. The safety risk may include, for example, the safety of the driver and/or and faulty operation of the vehicle such as a probability that the vehicle will be disabled. If a safety risk is determined, the current powertrain mode of the PHEV is maintained 208, and the exhausted carbon level continues to be monitored at operation 206. The safety risk can then be assessed at subsequent time after the risk has been averted. Otherwise, a mitigating action is sent from the municipality to the PHEV at operation 212. The mitigating action may include, but is not limited to, requesting the driver to switch the powertrain mode, charging a fee to the driver of the PHEV to continue operating the PHEV in the current powertrain mode, and/or automatically changing the current powertrain mode to a different powertrain mode. The result of the mitigating action is communicated to the municipality at operation 214. For example, a result as to whether the powertrain mode is changed may be wirelessly communicated to a municipality module operated by a city municipality, and the method ends.

Figure 3:
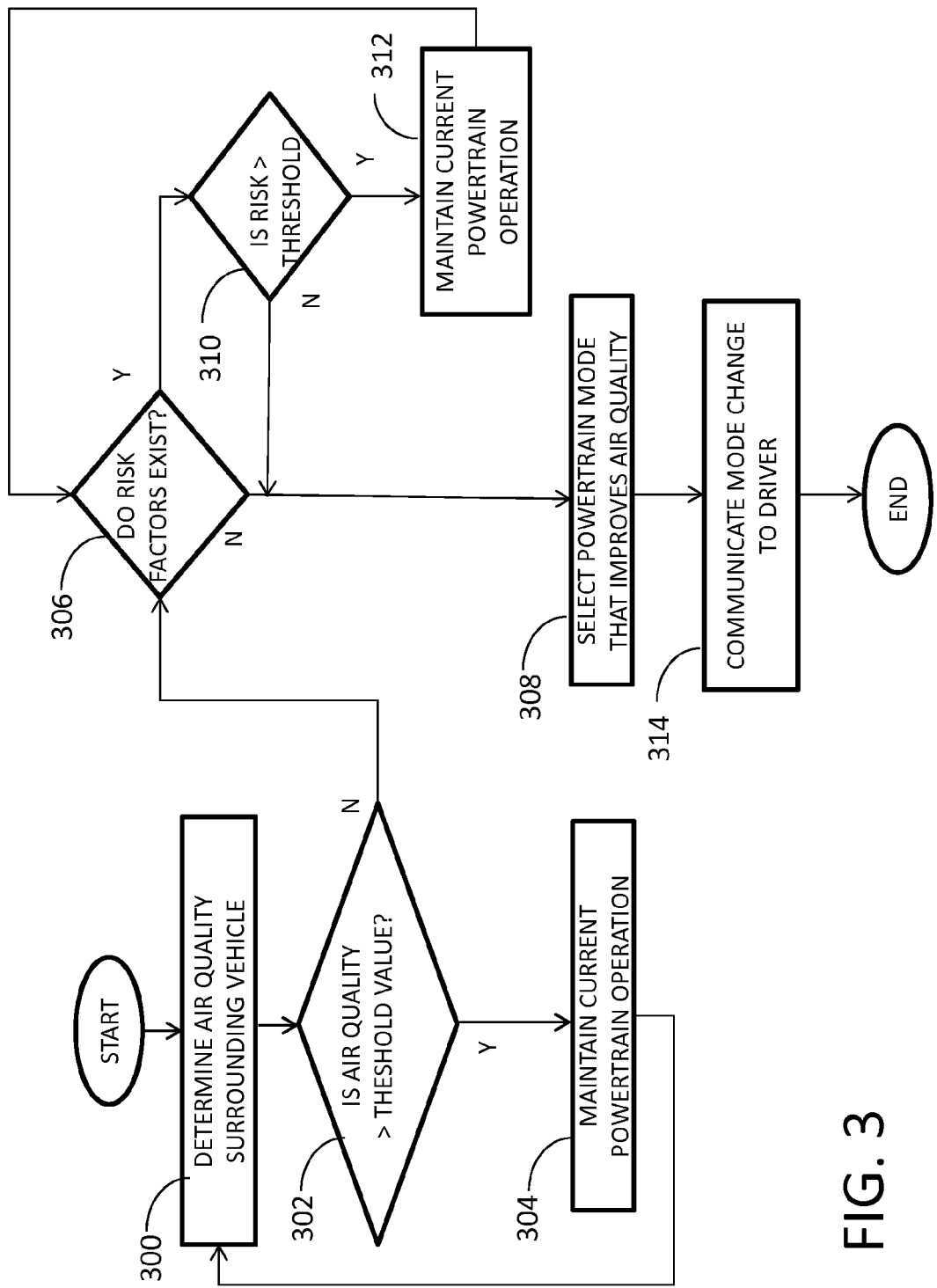
FIG. 3 is a flow diagram illustrating a method of controlling modes of a powertrain control system according to another embodiment.

Referring to FIG. 3, a flow diagram illustrates another method of controlling modes of a location-based powertrain control system according to an embodiment. At operation 300, a quality of air surrounding a vehicle including the powertrain control system is determined. The quality of air may be based on o-zone levels of the atmosphere, carbon levels of the atmosphere, etc. At operation 302, the air quality is compared to a threshold value. If the air quality exceeds the threshold value, the current powertrain mode of the powertrain system is maintained at operation 304 and the air quality is again determined at operation 302. Otherwise, a determination as to whether one or more risk factors exist is performed at operation 306.

If no risk factors exist, then the operating mode of the powertrain system is changed to an operating mode that reduces at least one emission from the vehicle to improve the air quality at operation 308. For example, the operating mode may be changed from and engine-only mode to a battery depletion mode where only the HEM, i.e., motor/generator, is used to drive the vehicle such that at least one emission exhausted from the vehicle are reduced. However, if one or more risk factors exist, a determination is made as to whether the risk factors exceed a risk threshold at operation 310.

The risk factors may include, for example, safety of the driver, safety of the vehicle, road conditions, weather, distance from a charging station, etc. A mathematical formula may be derived by a vehicle control module to determine a current risk level based on the one or more existing risk factors. If the risk level exceeds the risk threshold, the current operating mode of the powertrain system may be maintained at operation 312. For example, if the driver has initiated the engine-only mode, and the risk level exceeds the risk threshold, the driver may be permitted to maintain the engine-only mode. However, if the risk level is less than the risk threshold, the operating mode of the powertrain system is changed to an operating mode that reduces at least one emission exhausted from the vehicle to improve the air quality at operation 308. The changed operating mode is communicated to the driver at operation 314, and the method ends. Accordingly, an operation mode of the powertrain system may be changed to a different mode such that at least one emission from the vehicle contributing to a low air quality is reduced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just examples of various embodiments of the inventive concept. There may be many variations to the diagrams described therein without departing from the spirit of the invention. For instance, operations may be performed in a differing order or steps may be added, deleted or modified. All of these variations are considered a part of the claimed invention.

While various embodiments have been described, it will be understood that those skilled in the art, both now and in the future, may make various modifications which fall within the scope of the claims which follow. These claims should be construed to maintain the proper protection for the invention first described.

What is claimed is:

1. A method of controlling a powertrain system of a vehicle, the method comprising:
    determining a quality of air based on an o-zone level of the local atmosphere and a carbon level of the local atmosphere surrounding the vehicle using an electronic sensing unit;
    comparing via an electronic vehicle control module the determined quality of air to a threshold value;
    determining via the electronic vehicle control module a presence of at least one risk factor indicating a risk of incapacitating a driver of the vehicle in response to disengaging an internal combustion engine of the vehicle; and
    selecting via the electronic vehicle control module an operation mode of the powertrain system that reduces at least one emission exhausted from the vehicle that affects the determined quality of air in response to determining the at least one risk factor is below a risk threshold and the quality of air is below the threshold value.

2. The method of claim 1, further comprising alerting a request to change the operating mode of the powertrain system, the alerting comprising at least one of an icon and a sound output by the vehicle.

3. The method of claim 2, further comprising:
    determining via the electronic vehicle control module a location of the vehicle; and
    electrically communicating with a remotely located municipality module corresponding to the location to obtain at least one stored powertrain parameter;
    determining via the electronic vehicle control module at least one current operating condition of a powertrain system driving the vehicle and comparing the at least one current operating condition and the at least one stored powertrain parameter; and
    selecting via the electronic vehicle control module a different operating mode of the powertrain system among a plurality of operating modes based on the comparison, the different operating mode configured to reduce at least one emission exhausted from the vehicle.

4. The method of claim 3, further comprising selecting via the electronic vehicle control module between an internal combustion engine (ICE) operating mode and a hybrid electric motor (HEM) operating mode in response to determining the quality of air surrounding the vehicle.

5. The method of claim 4, further comprising selecting via the electronic vehicle control module between an internal combustion engine (ICE) operating mode and a hybrid electric motor (HEM) operating mode based on the comparison between the at least one current operating condition and the at least one stored powertrain parameter.

6. The method of claim 5, wherein the comparison is based on a maximum exhausted carbon emission level stored in the municipality module and at least one of a current carbon emission level exhausted from the ICE and the current quality of air detected by a sensor of the electronic sensing unit.

7. The method of claim 6, wherein the risk factor includes health of the driver and an electrical charge level of the rechargeable electronic battery.

\* \* \* \* \*

UNITED STATES PATENT AND TRADEMARK OFFICE
CERTIFICATE OF CORRECTION

PATENT NO. : 8,781,668 B1  
APPLICATION NO. : 13/965343  
DATED : July 15, 2014  
INVENTOR(S) : James R. Kozloski, Clifford A. Pickover and Robert W. Wisniewski Page 1 of 1

It is certified that error appears in the above-identified patent and that said Letters Patent is hereby corrected as shown below:

In the Specification

Column 5:
Line 7 should read - "events, such as smog levels and ozone levels, based on cur-"
Line 10 should read - "as atmospheric conditions including ozone levels, smog lev-"

Column 6:
Line 32 should read - "of air may be based on at least one of the ozone of the"

Column 7:
Line 28 should read - "pollution events such as smog alerts and/or ozone alerts."

Column 8:
Line 42 should read - "may be based on ozone levels of the atmosphere, carbon"

In the Claims

Claim 1, Column 9:
Line 39 should read - "determining a quality of air based on an ozone level of the"

Signed and Sealed this
Thirty-first Day of March, 2015

Michelle K. Lee
*Director of the United States Patent and Trademark Office*